May 13, 1958

T. DYMSZA ET AL 2,834,050

APPARATUS FOR THE INJECTION OF MOLTEN
THERMOPLASTIC MATERIAL FOR MOULDING

Filed March 17, 1955

Inventors:
Tadeusz Dymsza
Maurice Alfred Burdin
by Singer, Stern & Carlberg
Attorneys United States Patent Office 2,834,050
Patented May 13, 1958

2,834,050

APPARATUS FOR THE INJECTION OF MOLTEN THERMOPLASTIC MATERIAL FOR MOULDING

Tadeusz Dymsza and Maurice Alfred Burdin, London, England

Application March 17, 1955, Serial No. 495,018

Claims priority, application Great Britain June 23, 1954

1 Claim. (Cl. 18—30)

This invention relates to apparatus for the injection of molten thermoplastic material into moulds and more particularly to nozzle means through which molten plastic material is passed to the mould.

In general, in accordance with the present invention in such injection moulding apparatus wherein the molten plastic is fed by gravity, pressure or otherwise alone or in any combination to an injection nozzle, an outlet valve is disposed at the mouth of the nozzle, which latter is to be brought into contact with the mould to which the molten plastic is to be supplied from the nozzle, which outlet valve normally is closed by gravity and/or the pressure feed and has a stem or the like which in the closed position of the valve projects beyond the outlet nozzle.

Thus, when the nozzle and mould are brought together by relative movement, by the movement of the projection the valve is opened, which allows the heated thermoplastic material to be forced by the plunger or other pressure past the thus-opened valve to the mould, the structure of the stem and its associated parts in all cases permitting the passage of the molten thermoplastic material when the valve is in the open position.

When the feeding nozzle and mould again are separated, the supply pressure (due to whatever cause) or even the inertia or weight of the parts closes the valve which seals itself in position until the next opening. This obviously closes the outlet and prevents seepage, leakage or the like of the heated plastic even if it is in a fully liquid condition.

In order that the invention may be better understood, it will now be described with reference to the accompanying drawings which are given by way of example only and in which:

Fig. 1 is a cross sectional elevation of the nozzle portion of an apparatus constructed in accordance with the invention associated diagrammatically with the supply container of an apparatus to which it is fitted (although its use with such apparatus is only one of many applications and is non-limitative), the nozzle being shown in one operative position in relation to a mould which the apparatus is to supply.

Nozzles in accordance with the invention can be fitted to many forms of apparatus.

Figure 1:
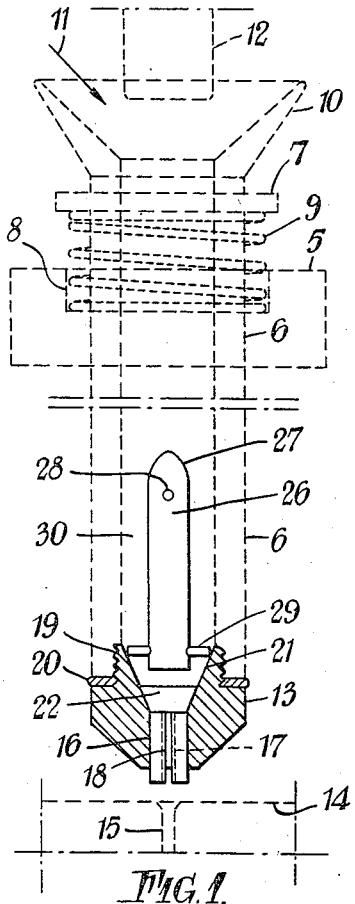
Figure 2:
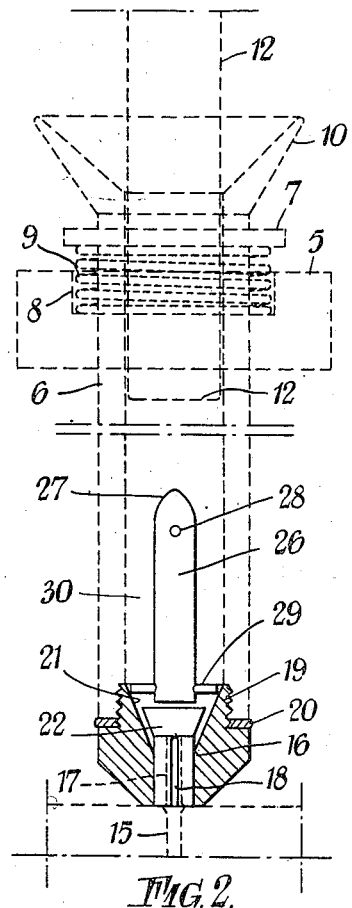
Fig. 2 is a similar view to Fig. 1 but with the parts in another position in relation to the said mould.
Figure 4:
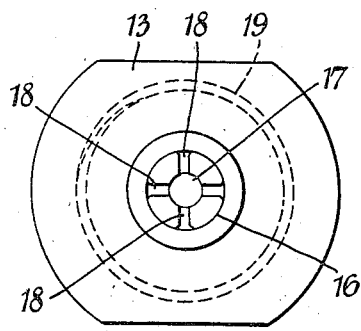
Fig. 4 shows to the same scale as Fig. 3 an under plan view of the nozzle device.

The drawings show such a nozzle so fitted to an apparatus of a known type, parts of which are diagrammatically illustrated in dotted lines in Figs. 1 and 2.

In such dotted representations, 5 is a fixed support bored vertically for the sliding action therein of a cylinder 6 having a collar 7 between which and a recess 8 in the support 5 there is interposed a lightly loaded compression spring 9 the purpose of which is at all normal times to keep the cylinder 6 in its uppermost position. At the upper end above the collar 7 the cylinder 6 has a flared mouth 10 which in its uppermost position comes just below the chute for the supply of raw material which enters in the direction of the arrow 11.

12 is a plunger adapted to fit into the hollow interior of the cylinder 6 and reciprocable by any suitable means so that in its uppermost position and in the uppermost position of the cylinder 6 space is left for the supply of material in the direction of the arrow 11.

At the lower end of the cylinder 6 there is arranged a nozzle 13 the lower end of which in the normal position comes a desired distance above the upper surface 14 of a mould having an inlet 15 in axial alignment with the axis of the cylinder 6. Although not shown, the portion of the cylinder 6 below the support 5 and above the nozzle 13, is surrounded by an electric heating coil adapted to be switched into circuit and having associated therewith rheostat and temperature-indicating means so that the temperature of the zone around the cylinder below the support 5 readily can be set and indicated.

In the normal working of this known device the thermoplastic crystals, powder or the like are supplied in the direction of the arrow 11 to fill the interior of the cylinder 6 from its base and nearly to its upper end. Consequently, upon the switching-in of the electrical heating device the material thereby surrounded is made molten whilst that coming above the heating coil remains in its supplied condition. Thereafter by depressing the plunger 12 it first of all presses upon the crystals, powder or the like and by the movement from a lower reaction surface the cylinder 6 is depressed against the action of the spring 9 until the mouth of the nozzle comes into contact with the upper surface of the mould. Then by continued depression of the plunger 12 the molten plastic coming below the zone of the plastic in crystal or powder form, is forced through the aperture of the nozzle into the mould through its passageway 15.

Normally, in apparatus as hitherto constructed, the aperture in the nozzle is of small diameter so that between the separate operations of the device as there is no continuing pressure feed between such operations very little if any of the molten plastic flows out through the small aperture. However, there may be, and frequently is, a small worm-like exudence which before the next operation to bring the nozzle into contact with the mould, has to be cleared.

Further, if the moulding temperature of the plastic concerned is such that the said plastic must be of great fluidity, then in place of such worm-like exudence there may be a liquid-like flow which creates many disadvantages.

The present invention is designed to overcome all these drawbacks and in accordance therewith and as shown in the drawings the nozzle 13 has a greatly enlarged outlet 16 in which there is adapted to slide a cylindrical valve stem. This comprises a central bore 17 and cruciform cuts 18 arranged at 90° separation. The nozzle has an inwardly projecting boss 19 in screw-threaded engagement with the outer end of the cylinder 6, a washer 20 being interposed between the parts, and from the inner end of the boss 19 there is a conical bore 21 leading to the cylindrical outlet 16. The smaller part of this conical bore 21 forms a valve seating for a conical valve 22 formed with or attached to the valve stem. When the valve is in the closed position, for example as shown in Fig. 1, the stem projects a desired distance from the end of the nozzle.

In consequence of the above construction, when the parts are in the position shown in Fig. 1, that is to say, when the cylinder 6 is in its withdrawn position, the valve 22 closes the outlet from such cylinder and the outer end of the nozzle comes a desired distance from the surface 14 of the mould with the outer end of the stem of the valve 22 projecting from the outlet 16 of the nozzle.

Figure 3:
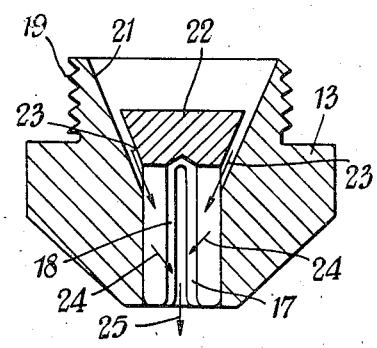
Fig. 3 shows to a larger scale and in complete section a nozzle and a certain associated part in the position shown in Fig. 2.

Upon the operation of the device, when the cylinder 6 is depressed the outer end of the nozzle makes contact with the surface 14 of the mould in the usual manner but prior thereto the outer end of the projecting valve stem contacts the surface of the mould to commence the opening movement of the valve 22. When, however, the end of the nozzle contacts the surface of the mould 14, then the valve 22 is definitely in the open position. This position is shown in Fig. 2 and in the enlarged view Fig. 3.

From this it will be appreciated that the molten plastic from the interior of the cylinder 6 passes by the valve 22 in the annular passage between its outer surface and the inner surface of the conical bore 21, that is to say, as indicated by the arrows 23, to the slits 18 in the valve stem and from these slits to the central bore 17 of the valve stem in the direction of the arrows 24 so that the molten plastic then passes as indicated by the arrow 25 to the passage 15 for entry into the mould.

By the above construction it will be realised that even when the molten plastic material is highly liquid when the mechanism is in the out-of-action position, as indicated in Fig. 1, it does not flow and only commences to flow when the cylinder 6 is depressed to the position indicated in Fig. 2.

As the lowering action to bring the nozzle into contact with the mould takes but a fraction of a second there is no fear of loss by "worms" or liquid flow during the period the valve is opening. The nozzle remains in contact with the mould for the necessary period to enable the plunger to force out the molten plastic into the mould; again, there is no likelihood of leakage in the raising movement when the valve closes as this takes but a fraction of a second.

Although the valve 22 as shown is a conical valve, it can be another form of valve. Again, in place of having a flat upper surface this can be concave or convex. Further, although its stem has four slits, it can have more or less than four slits.

Moreover, although it is preferred there should be a central passageway such as 17 for the ultimate delivery of the molten plastic to the mould, the passage thereto from the interior of the cylinder 6 when the valve is open need not be by slits in the stem but could be by other openings such as by suitably positioned lateral apertures.

Figs. 1 and 2 of the drawings show a so-called "torpedo" which consists of a cylindrical mass 26 of metal having a somewhat coned upper end 27 and with diametrically projecting pins 28 towards the upper end and 29 towards the lower end, these latter being mutually at right angles to hold the mass 26 more or less centrally disposed in the hollow interior of the cylinder 6.

Such torpedo may in some cases be utilised in apparatus according to the invention. It serves a known purpose to assure that the melting or part-molten crystals, powder or the like are brought to the fully molten condition in the annular space 30 between its outer surface and the interior surface of the cylinder in the position where such cylinder is subjected to the heat, and so that any tendency of a hard core to be formed is obviated.

It should be observed that the torpedo 26 is not fixed in the cylinder and that the projections 29 are so designed that the lowermost position the torpedo can occupy is such that it does not in any way hinder the full opening of the valve 22, as will be seen from Fig. 2.

The invention is not limited to the precise forms or details of construction herein described, as these may be varied to suit particular requirements.

What we claim and desire to secure by Letters Patent of the United States of America is:

In an apparatus for the injection of molten thermoplastic material into molds having a sprue opening, a discharge cylinder presented to said mold, an outlet nozzle on said cylinder having a central bore larger than said sprue opening and being provided with an internal conical valve seat, said central bore forming an outlet passage as an extension of said conical valve seat, a conical valve having a conicity the same as that of the conical valve seat the smallest diameter of which is equal to the diameter of said outlet passage, and arranged for movement into and out of seating engagement with said valve seat, a stem on said valve having a diameter equal to the internal diameter of said outlet passage and arranged to extend beyond the outer end of said nozzle to unseat said valve when the end of the stem is brought into engagement with the mold body, said valve stems being provided with a longitudinally extending central bore of a diameter substantially equal to the diameter of said sprue opening, said bore extending from the outer end of said stem inwardly to said conical valve and said valve stem being provided with a series of equiangularly spaced radially extending slots extending axially from the outer end of the stem to its junction with said valve and providing communication from the outlet passage to the central bore along the whole of the length of said valve stem, said valve preventing discharge of material from said cylinder when in its closed position and the lower slotted portion of said valve stem being closed when the discharge nozzle is moved into engagement with a mold, whereby material from said cylinder will be discharged inwardly through the radial slots to the central bore of said stem and through said sprue opening.

References Cited in the file of this patent

UNITED STATES PATENTS

| | | |
|---|---|---|
| 1,155,472 | De Temple | Oct. 5, 1915 |
| 2,318,031 | Tucker | May 4, 1943 |
| 2,359,839 | Goessling | Oct. 10, 1944 |